(12) United States Patent
Cheng et al.

(10) Patent No.: US 11,803,248 B2
(45) Date of Patent: Oct. 31, 2023

(54) GESTURE OPERATION METHOD, APPARATUS, DEVICE AND MEDIUM

(71) Applicant: Qingdao Pico Technology Co., Ltd., Shandong (CN)

(72) Inventors: Wenhao Cheng, Beijing (CN); Huipu Wang, Beijing (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 18/088,213

(22) Filed: Dec. 23, 2022

(65) Prior Publication Data

US 2023/0125393 A1  Apr. 27, 2023

Related U.S. Application Data

(63) Continuation of application No. PCT/CN2022/105375, filed on Jul. 13, 2022.

(30) Foreign Application Priority Data

Aug. 12, 2021 (CN) .......................... 202110926646.2

(51) Int. Cl.
*G06F 3/01* (2006.01)
*G06F 3/0354* (2013.01)
(Continued)

(52) U.S. Cl.
CPC .......... *G06F 3/017* (2013.01); *G06F 3/03549* (2013.01); *G06T 7/50* (2017.01);
(Continued)

(58) Field of Classification Search
None
See application file for complete search history.

(56) References Cited

U.S. PATENT DOCUMENTS 11,249,550 B2 *  2/2022  Won .......................... G09B 9/00
11,546,951 B1 *  1/2023  Siminoff ................ H04N 7/186
(Continued)

FOREIGN PATENT DOCUMENTS

CN        108334198 A     7/2018
CN        109976519 A     7/2019
(Continued)

OTHER PUBLICATIONS

International Search Report issued for PCT/CN2022/105375, dated Oct. 10, 2022.

*Primary Examiner* — Talha M Nawaz
(74) *Attorney, Agent, or Firm* — ARENTFOX SCHIFF LLP

(57) ABSTRACT

The present disclosure provides a gesture operation method, apparatus, device and medium. The method includes: obtaining depth information of a user hand; determining space coordinates of a virtual hand corresponding to the hand in a virtual space based on the depth information; binding trackballs to the virtual hand based on the space coordinates, which includes binding a palm ball to a palm position of the virtual hand, and binding at least one fingertip ball to at least one fingertip position of the virtual hand, a volume of the palm ball being greater than the at least one fingertip ball; and performing a corresponding operation in the virtual space based on a straight-line distance between the at least one fingertip ball and the palm ball.

14 Claims, 4 Drawing Sheets

(51) Int. Cl.
*G06T 7/50* (2017.01)
*G06T 7/70* (2017.01)
*G06V 10/74* (2022.01)
*G06T 19/20* (2011.01)

(52) U.S. Cl.
CPC ............... *G06T 7/70* (2017.01); *G06T 19/20* (2013.01); *G06V 10/761* (2022.01); *G06T 2219/2004* (2013.01)

(56) References Cited

U.S. PATENT DOCUMENTS

| | | | |
|---|---|---|---|
| 2011/0164029 A1* | 7/2011 | King | G06T 19/00 345/173 |
| 2012/0194549 A1* | 8/2012 | Osterhout | G06Q 30/02 345/633 |
| 2012/0242697 A1* | 9/2012 | Border | G02B 27/017 345/633 |
| 2014/0071069 A1* | 3/2014 | Anderson | A63F 13/21 345/173 |
| 2017/0140552 A1 | 5/2017 | Woo et al. | |
| 2019/0041902 A1* | 2/2019 | Lee | G06F 3/0304 |
| 2020/0286302 A1* | 9/2020 | Lee | G06F 3/017 |
| 2023/0024958 A1* | 1/2023 | Qian | G06F 3/011 |

FOREIGN PATENT DOCUMENTS

| | | |
|---|---|---|
| CN | 112000224 A | 11/2020 |
| CN | 113608619 A | 11/2021 |

\* cited by examiner

GESTURE OPERATION METHOD, APPARATUS, DEVICE AND MEDIUM

CROSS REFERENCE TO RELATED APPLICATIONS

This application is a continuation application of International Application No. PCT/CN2022/105375 filed on Jul. 13, 2022, which claims priority to Chinese Patent Application No. 202110926646.2, entitled "Bare Hand Operation Method and System in Augmented Reality" filed on Aug. 12, 2021, the entire content of which is hereby incorporated by reference.

TECHNICAL FIELD

The present disclosure relates to the technical field of virtual reality, and more specifically, to a gesture operation method, apparatus, device and medium.

BACKGROUND

Due to the progress of science and technology and diversified development of market demand, virtual reality systems are more and more popular, and are applied to various fields such as computer games, health, security, industry and education training. For example, a mixed virtual reality system is being integrated to various aspects of life such as mobile communication devices, game machines, personal computers, cinemas, theme parks, university laboratories, student classrooms, hospital exercise rooms and the like.

With the development of the artificial reality field, it is necessary for users to interact with content in VR, AR and MR scenes; and at the same time, "bare hand" gesture interaction, which is convenient to operate, has become the development trend nowadays. At present, in the scene, most of the existing gesture interactions are single-finger gesture such as a "clicking" gesture of a forefinger, a "pinching" gesture of a thumb and the forefinger, and a "confirming" gesture of making a fist. The simple interaction gesture of "clicking" gesture of a single forefinger, "pinching" gesture of the thumb and the forefinger and "confirming" gesture of making a first requires high accuracy of gesture recognition, so that the investment of manpower and financial resources is bound to be large; and moreover, when virtual coordinates of the hand is collected, due to the high accuracy requirement, the positioning of important joints of the hand are usually unstable, so that the interaction accuracy and experience are relatively poor.

Therefore, it is urgent to provide a solution that can reduce the investment of the human and financial investment, improve the gesture recognition accuracy and improve the gesture operation stability.

SUMMARY

In view of the above problems, a purpose of the present disclosure is to provide a gesture operation method, so as to solve the problems that the simple interaction gesture of "clicking" gesture of a single forefinger, "pinching" gesture of a thumb and the forefinger and "confirming" gesture of making a first requires high accuracy of gesture recognition, so that the investment of manpower and financial resources is bound to be large; and moreover, when virtual coordinates of the hand is collected, due to the high accuracy requirement, the positioning of important joints of the hand are usually unstable, so that the interaction accuracy and experience are relatively poor.

The present disclosure provides a gesture operation method, which includes: obtaining depth information of a user hand; determining space coordinates of a virtual hand corresponding to the hand in a virtual space based on the depth information of the hand; binding trackballs to the virtual hand based on the space coordinates, which includes binding a palm ball to a palm position of the virtual hand, and binding at least one fingertip ball to at least one fingertip position of the virtual hand, a volume of the palm ball being greater than the at least one fingertip ball; and performing a corresponding operation in the virtual space based on a straight-line distance between the at least one fingertip ball and the palm ball.

Preferably, the operation of determining the space coordinates of the virtual hand corresponding to the hand in the virtual space based on the depth information of the hand includes: obtaining a relative distance between the hand and a sensor; obtaining a true wrist position of the hand based on a position of the sensor and the relative distance; mapping the true wrist position into the virtual space with reference to virtual coordinates of the sensor, to form wrist space coordinates; and performing calculation and filling based on the wrist space coordinates and hand joint information to form the virtual hand, and obtaining the space coordinates of the virtual hand.

Preferably, the operation of binding the palm ball to the palm position of the virtual hand, and binding the at least one fingertip ball to the at least one fingertip position of the virtual hand include: obtaining a virtual palm position and at least one virtual fingertip position of the virtual hand; and arranging the palm ball at the virtual palm position, and arranging the at least one fingertip ball at the at least one virtual fingertip position. The palm ball always moves as the virtual palm position moves; and the fingertip ball always moves as the at least one virtual fingertip position moves.

Preferably, the at least one fingertip ball includes a little-finger fingertip ball, a fourth-finger fingertip ball and a middle-finger fingertip ball.

Preferably, the operation of performing the corresponding operation in the virtual space based on the straight-line distance between the at least one fingertip ball and the palm ball includes: obtaining the straight-line distance between the at least one fingertip ball and the palm ball, the straight-line distance representing a straight-line distance between the at least one fingertip ball and the palm ball formed when the finger except the thumb approaches the palm to make a first action; and performing the corresponding operation in the virtual space based on the straight-line distance between the at least one fingertip ball and the palm ball.

Preferably, the method further includes: binding a thumb ball to a thumb position of the virtual hand, and binding a forefinger cuboid to a forefinger position of the virtual hand.

The operation of binding the thumb ball to the thumb position of the virtual hand, and binding the forefinger cuboid to the forefinger position of the virtual hand include: obtaining a virtual thumb position and a virtual forefinger position of the virtual hand; and arranging the thumb ball at the virtual thumb position, and arranging the forefinger cuboid at the virtual forefinger position. The thumb ball always moves as the virtual thumb position moves; and the forefinger cuboid always moves as the virtual forefinger position moves.

Preferably, the method further includes: obtaining a distance between the thumb ball and the forefinger cuboid, the distance between the thumb ball and the forefinger cuboid representing a distance between the thumb ball and the forefinger cuboid formed when the thumb approaches the forefinger to make a pinching action; and triggering an operation cursor at a corresponding position of the virtual hand based on the distance between the thumb ball and the forefinger cuboid, to perform the corresponding operation in the virtual space.

The present disclosure provides a gesture operation apparatus which implements the aforementioned gesture operation method and includes: an information obtaining module configured to obtain depth information of a user hand; a coordinate corresponding module configured to determine space coordinates of a virtual hand corresponding to the hand in a virtual space based on the depth information of the hand; a tracking and binding module configured to bind trackballs to the virtual hand based on the space coordinates, which includes binding a palm ball to a palm position of the virtual hand, and binding at least one fingertip ball to at least one fingertip position of the virtual hand, a volume of the palm ball being greater than the at least one fingertip ball; and an interaction performing module configured to perform a corresponding operation in the virtual space based on a straight-line distance between the at least one fingertip ball and the palm ball.

Preferably, the coordinate corresponding module includes: a true position calculation unit configured to obtain a relative distance between the hand and a sensor; and obtain a true wrist position of the hand based on a position of the sensor and the relative distance; and a virtual coordinate corresponding unit configured to map the true wrist position into the virtual space with reference to virtual coordinates of the sensor, to form wrist space coordinates; and perform calculation and filling based on the wrist space coordinates and hand joint information to form the virtual hand, and obtain the space coordinates of the virtual hand.

Preferably, the apparatus further includes a pinching operation unit. The pinching operation unit is configured to obtain a distance between the thumb ball and the forefinger cuboid, the distance between the thumb ball and the forefinger cuboid representing a distance between the thumb ball and the forefinger cuboid formed when the thumb approaches the forefinger to make a pinching action; and trigger an operation cursor at a corresponding position of the virtual hand based on the distance between the thumb ball and the forefinger cuboid, to perform the corresponding operation in the virtual space.

The present disclosure provides an electronic device, which includes: a processor and a memory. The memory has a computer program stored thereon. The processor is configured to invoke and execute the computer program stored in the memory to perform the gesture operation method described in the aforementioned embodiments.

The present disclosure provides a computer readable storage medium having a computer program stored thereon. The computer program causes a computer to perform the gesture operation method described in the aforementioned embodiments.

The present disclosure provides a computer program product containing program instructions. The program instructions, when being executed on an electronic device, cause the electronic device to perform the gesture operation method described in the aforementioned embodiments.

It may be seen from the above technical solutions that according to the gesture operation method, apparatus, device and medium provided by the present disclosure, the depth information of the user hand is obtained, the space coordinates of the virtual hand corresponding to the hand in the virtual space is determined based on the depth information; then the trackballs are bound to the virtual hand based on the space coordinates, which including binding the palm ball to the palm position of the virtual hand, and binding the at least one fingertip ball to the at least one fingertip position of the virtual hand, the volume of the palm ball being greater than the fingertip ball; and the corresponding operation is performed in the virtual space based on the straight-line distance between the at least one fingertip ball and the palm ball. According to the gesture operation method, because of the introduction of the small ball moving with the hand, a purpose of bare hand operation is achieved; the stability is higher, and the accuracy requirement is lower, thereby reducing the manpower and financial resources; and moreover, since the accuracy requirement is relatively low, the clicking operation is facilitated, thereby greatly improving the interaction experience of the user.

BRIEF DESCRIPTION OF DRAWINGS

Other purposes and results of the present disclosure are clearer and easier to understand with reference to the following description in combination with the accompanying drawings and with more comprehensive understanding of the present disclosure.

DESCRIPTION OF EMBODIMENTS

Technical solutions in embodiments of the present disclosure are clearly and completely described in combination with accompanying drawings in embodiments of the present disclosure. Apparently, the described embodiments are merely some embodiments of the present disclosure, not all embodiments. All other embodiments obtained by those ordinary skilled in the art according to the embodiments of the present disclosure without inventive efforts shall fall within the protection scope of the present disclosure.

It should be noted that terms "first", "second" and the like in the description and claims of the present disclosure and the above drawings are used for distinguishing similar objects, and are not necessarily used for describing a specific order or sequence. It should be understood that data used here may be interchanged under appropriate conditions, so that embodiments of the present disclosure described herein can be implemented in a sequence other than those illustrated or described herein. In addition, the terms "include" and "have" and any variations thereof are intended to cover non-exclusive inclusion, for example, a process, method, system, product, or server including a series of steps or elements is not necessarily limited to those steps or elements that are clearly listed, but may include other steps or elements that are not clearly listed or inherent to these processes, methods, products, or devices.

At present, in the scene, most of the existing gesture interactions are single-finger gesture such as a "clicking" gesture of a forefinger, a "pinching" gesture of a thumb and the forefinger, and a "confirming" gesture of making a fist. The simple interaction gesture of "clicking" gesture of a single forefinger, "pinching" gesture of the thumb and the forefinger and "confirming" gesture of making a first requires high accuracy of gesture recognition, so that the investment of manpower and financial resources is bound to be large; and moreover, when virtual coordinates of the hand is collected, due to the high accuracy requirement, the positioning of important joints of the hand are usually unstable, so that the interaction accuracy and experience are relatively poor.

For the above problems, the present disclosure provides a gesture operation method, apparatus, device and medium. Specific embodiments of the present disclosure are described in detail below in combination with accompanying drawings.

Figure 5:
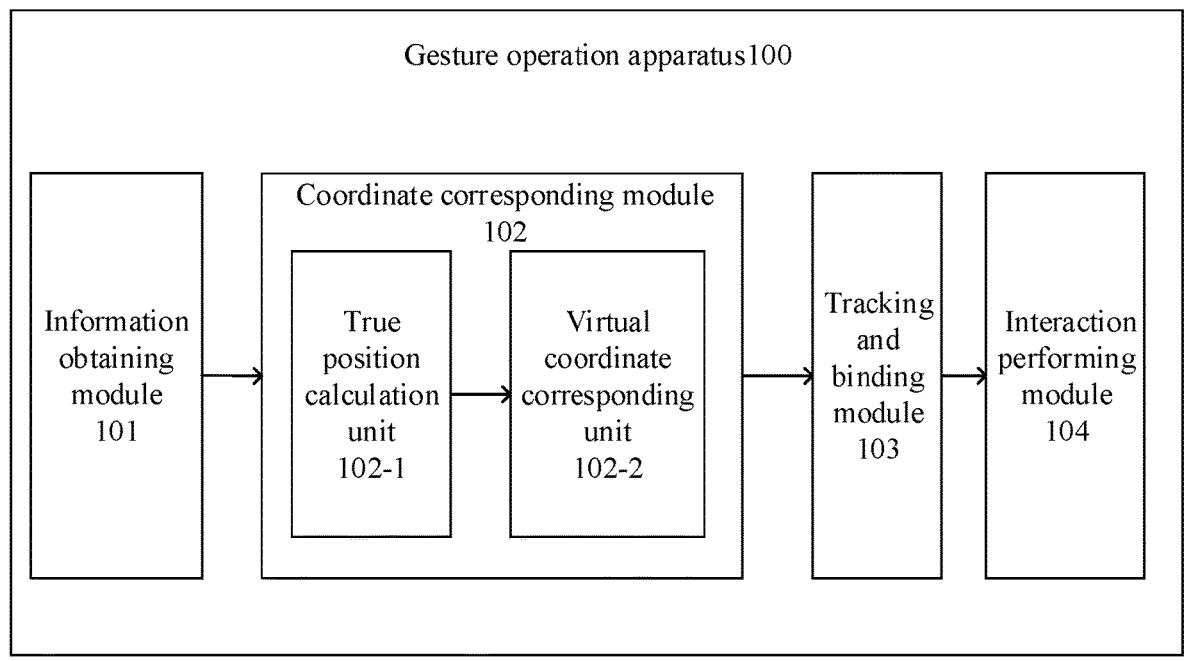
FIG. 5 is a schematic block diagram of a gesture operation apparatus according to an embodiment of the present disclosure.
Figure 6:
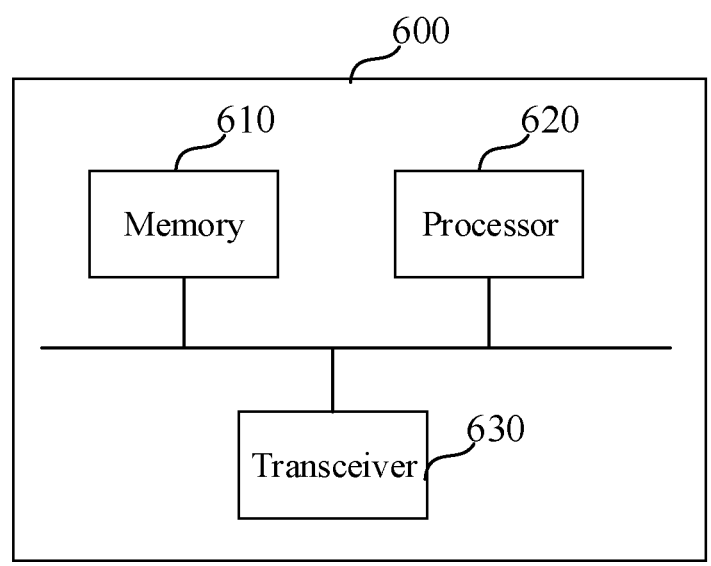
FIG. 6 is a schematic block diagram of an electronic device according to an embodiment of the present disclosure.

In order to illustrate the gesture operation method, apparatus, device and medium provided by the present disclosure, FIG. 1, FIG. 2, FIG. 3 and FIG. 4 show the gesture operation method according to an embodiment of the present disclosure by way of example; FIG. 5 shows a gesture operation apparatus according to an embodiment of the present disclosure by way of example; and FIG. 6 shows an electronic device according to an embodiment of the present disclosure by way of example.

The following description of the exemplary embodiments is merely illustrative, rather than making any limitation to the present disclosure, applications or use of the present disclosure. Technologies and devices known to the ordinary skilled in related art may not be discussed in detail, but the technologies and devices should be regarded as a part of the description in appropriate cases.

Figure 1:
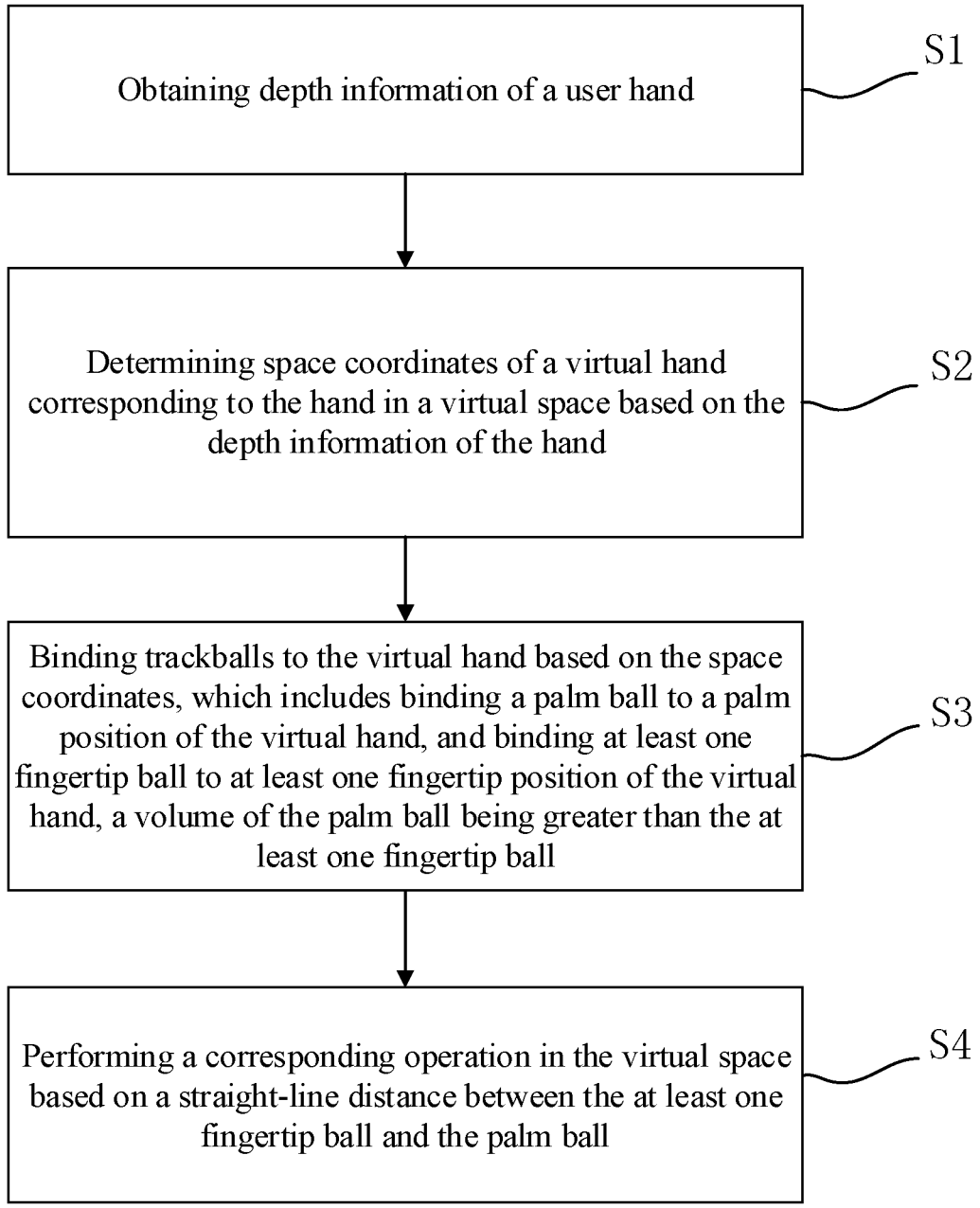
FIG. 1 is a flow chart of a gesture operation method according to an embodiment of the present disclosure.

As shown in FIG. 1, the present disclosure provides a gesture operation method, which includes the following steps.

At step S1, depth information of a user hand is obtained.

At step S2, space coordinates of a virtual hand corresponding to the hand in a virtual space is determined based on the depth information of the hand.

At step S3, trackballs are bound to the virtual hand based on the space coordinates. A palm ball is bound to a palm position of the virtual hand, at least one fingertip ball is bound to at least one fingertip position of the virtual hand, and a volume of the palm ball is greater than the at least one fingertip ball.

At step S4, a corresponding operation is performed in the virtual space based on a straight-line distance between the at least one fingertip ball and the palm ball.

It should be noted that in the embodiment of the present disclosure the palm ball is determined to be greater than the at least one fingertip ball, which may be realized based on the volume, or based on a diameter or a radius of the ball, that is, the diameter of the palm ball is greater than the diameter of the at least one fingertip ball, or the radius of the palm ball is greater than the radius of the at least one fingertip ball. The present disclosure is not limited to any of these examples.

As shown in FIG. 1, at step S1, the depth information of the user hand may be obtained by a depth camera or any camera that can obtain the depth information. The present disclosure is not limited to any of these examples.

In the present embodiment, at step S2, the operation of determining the space coordinates of the virtual hand corresponding to the hand in the virtual space based on the depth information of the hand may be realized through the following steps.

At step S11, a relative distance between the user hand and a sensor is obtained.

At step S12, a true wrist position of the hand is obtained based on a position of the sensor and the relative distance.

At step S13, the true wrist position is mapped into the virtual space with reference to virtual coordinates of the sensor, to form wrist space coordinates.

At step S14, calculation and filling are performed based on the wrist space coordinates and hand joint information to form the virtual hand, and the space coordinates of the virtual hand are obtained.

The sensor refers to a sensor in a VR system.

Specifically, in the present disclosure, a position relation between the hand and the sensor may be obtained first by the depth camera or other type of cameras, to determine the relative distance between the hand and the sensor based on the position relation. Since the true position of the sensor and the virtual coordinates of the sensor are known, the true wrist position of the user hand may be calculated based on the true position and relative distance of the sensor; and secondly, based on the known virtual coordinates of the sensor, the true wrist position may be mapped into the virtual space, so that the wrist space coordinates are obtained. Moreover, a size of the hand and a position relation (hand joint information) among all joints of the hand are known, the coordinates of each joint of the hand in the virtual space may be calculated based on the wrist space coordinates, thereby forming the virtual hand by filling; and furthermore, the space coordinates of the whole virtual hand in the VR system are obtained.

Figure 2:
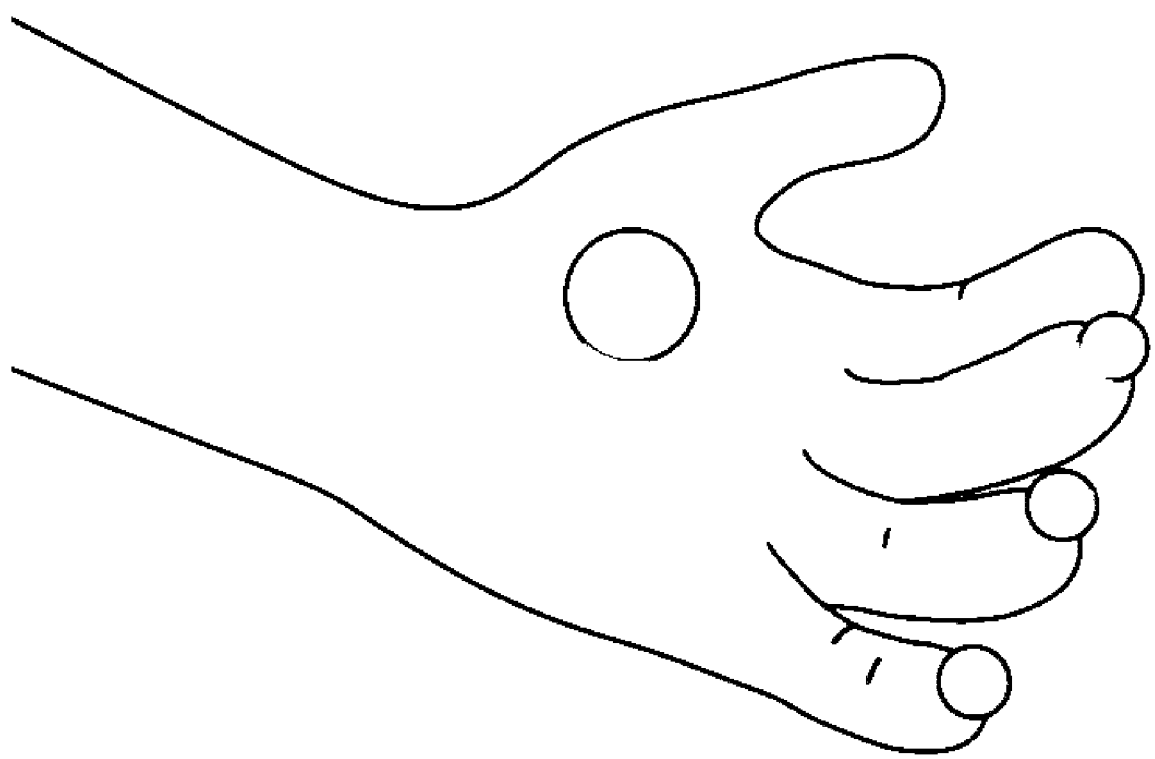
FIG. 2 is a schematic diagram of binding a trackball in the gesture operation method according to an embodiment of the present disclosure.

As shown in FIG. 1 and FIG. 2, step S3 is a process of binding the trackball to the virtual hand. As shown in FIG. 2, a process of binding the palm ball (large ball) to the palm position of the virtual hand, and binding the at least one fingertip ball (small ball) to the at least one fingertip position of the virtual hand includes the following steps.

At step S21, a virtual palm position and at least one virtual fingertip position of the virtual hand are obtained.

At step S22, the palm ball is arranged at the virtual palm position, and the at least one fingertip ball is arranged at the virtual fingertip position.

The palm ball always moves as the coordinates of the virtual palm position move; and the fingertip ball always moves as the coordinates of the at least one virtual fingertip position move.

In this way, the distance between the at least one fingertip and the palm may be determined by the distance between the palm ball and the at least one fingertip ball, so that a bending degree of the at least one finger is determined to determine whether the whole hand makes a fist. In the present embodiment, the at least one fingertip ball includes a little-finger fingertip ball, a fourth-finger fingertip ball and a middle-finger fingertip ball, that is, the position relation between the little finger, the fourth finger, the middle finger and the palm is determined based on the fingertip ball, thereby determining whether the user makes a first or not. The problem that the traditional bare hand operation requires high accuracy is solved in this way of determining a state of the user hand by binding the ball, thereby improving the positioning stability of the virtual hand, reducing the accuracy requirement, and improving the immersive experience of the user.

As shown in FIG. 1 and FIG. 2, at step S4, the corresponding operation is performed in the virtual space based on the straight-line distance between the at least one fingertip ball and the palm ball. For example, an implementation process of step S4 in the present embodiment includes the following steps.

At step S31, the straight-line distance between the at least one fingertip ball and the palm ball is obtained. The straight-line distance between the at least one fingertip ball and the palm ball represents a straight-line distance between the at least one fingertip ball and the palm ball formed when the finger except the thumb approaches the palm to make a first action.

At step S32, the corresponding operation is performed in the virtual space based on the straight-line distance between the at least one fingertip ball and the palm ball.

It should be noted that the at least one fingertip ball and the palm ball are virtual balls, which may be colored, and may also be colorless. For convenience of illustration, the palm ball and the at least one fingertip ball are shown in FIG. 2, but in the present embodiment, the palm ball and the at least one fingertip ball are colorless, transparent and invisible virtual ball bodies, which may move with the movement of a bonded part of the hand so as to improve the stability of the coordinate information of the virtual hand, thereby ensuring the accuracy for determining the gesture of the virtual hand.

Optionally, in the present disclosure, the straight-line distance between the at least one fingertip ball and the palm ball is obtained in real time, and the straight-line distance between the at least one fingertip ball and the palm ball is compared with a predetermined trigger threshold. If the straight-line distance between the at least one fingertip ball and the palm ball is smaller than the predetermined trigger threshold, it indicates that the user needs to perform the interactive operation, and at the time, a first trigger condition is established. If the first trigger condition is established, the present disclosure may automatically perform any operation corresponding to the first trigger condition immediately, that is, perform any corresponding operation in the virtual space. In this way, a response speed for the bare hand interaction may be increased.

The predetermined trigger threshold may be set flexibly according to the actual application requirement, which is not limited herein.

Figure 3:
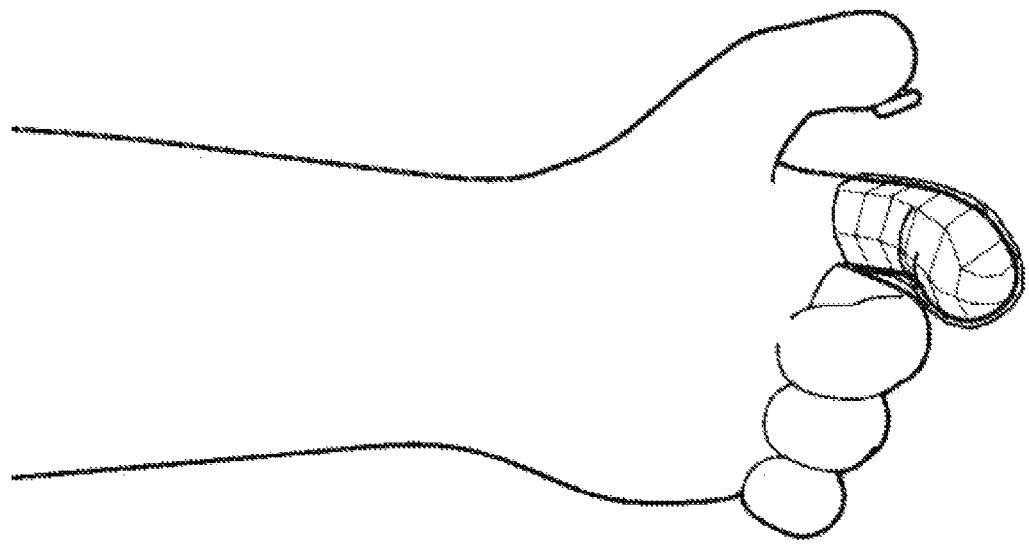
FIG. 3 is a schematic diagram of a thumb ball and a forefinger cuboid in the gesture operation method according to an embodiment of the present disclosure.

As shown in FIG. 1 and FIG. 3, if the user makes a first once, the first trigger condition is satisfied once, and correspondingly, the first trigger condition is established, and at the time, the VR system automatically performs an interactive operation corresponding to the first trigger condition. A correspondence between the interactive operation and the first trigger condition is preset in advance, and a specific preset process is not described in detail here. The first trigger condition may correspond to any operation with interactive properties, such as accessing a page and exiting the page, clicking any cursor or icon on an interface of a displayer in the VR system, and even performing on and off operations, etc. The on and off include, but are not limited to the on or off of the displayer, that is, when the user makes the first action, the VR system may automatically perform any interactive operation such as access or exit the page, click any cursor or icon on the interface of the displayer in the VR system, and even perform on or off operation.

Furthermore, as shown in FIG. 1 and FIG. 3, the gesture operation method in the embodiment of the present disclosure further includes: step S5 of binding a thumb ball to a thumb position of the virtual hand, and binding a forefinger cuboid to a forefinger position of the virtual hand.

Optionally, in the present disclosure, a process of binding the thumb ball (an oval on the thumb in FIG. 3) to the thumb position of the virtual hand, and binding the forefinger cuboid to the forefinger position of the virtual hand includes the following steps.

At step S511, a virtual thumb position and a virtual forefinger position are obtained.

At step S512, the thumb ball is arranged at the virtual thumb position, and the forefinger cuboid is arranged at the virtual forefinger position.

The thumb ball always moves as the coordinates of the virtual thumb position move; and the forefinger cuboid always moves as the coordinates of the virtual forefinger position move.

It should be noted that the forefinger cuboid not only refers to the traditional cuboid in actual meaning, but also a cuboid-like marker wrapping the forefinger as shown in FIG. 3, which may be slightly flatter and irregular than the cuboid. The present disclosure is not limited to any of these examples.

In the embodiment shown in FIG. 1 and FIG. 3, the gesture operation method of the present disclosure further includes the following steps.

At step S521, a distance between the thumb ball and the forefinger cuboid is obtained. The distance between the thumb ball and the forefinger cuboid represents a distance between the thumb ball and the forefinger cuboid formed when the thumb approaches the forefinger to make a pinching action At step S522, an operation cursor at a corresponding position of the virtual hand is triggered based on the distance between the thumb ball and the forefinger cuboid, to perform the corresponding operation in the virtual space.

A specific implementation process in which the operation cursor at the corresponding position of the virtual hand is triggered based on the distance between the thumb ball and the forefinger cuboid to perform the corresponding operation in the virtual space includes: if the distance between the thumb ball and the forefinger cuboid is smaller than a predetermined pinching threshold, establishing a second trigger condition. Then, the operation cursor on the corresponding position of the virtual hand in the displayer of the VR system is triggered based on the second trigger condition, to perform a VR interactive operation. If the distance between the thumb ball and the forefinger cuboid is greater than or equal to the predetermined pinching threshold, the second trigger condition is not established, and step S521 is continued to be performed. The predetermined pinching threshold may be set flexibly according to the actual application requirement, which is not limited herein.

Figure 4:
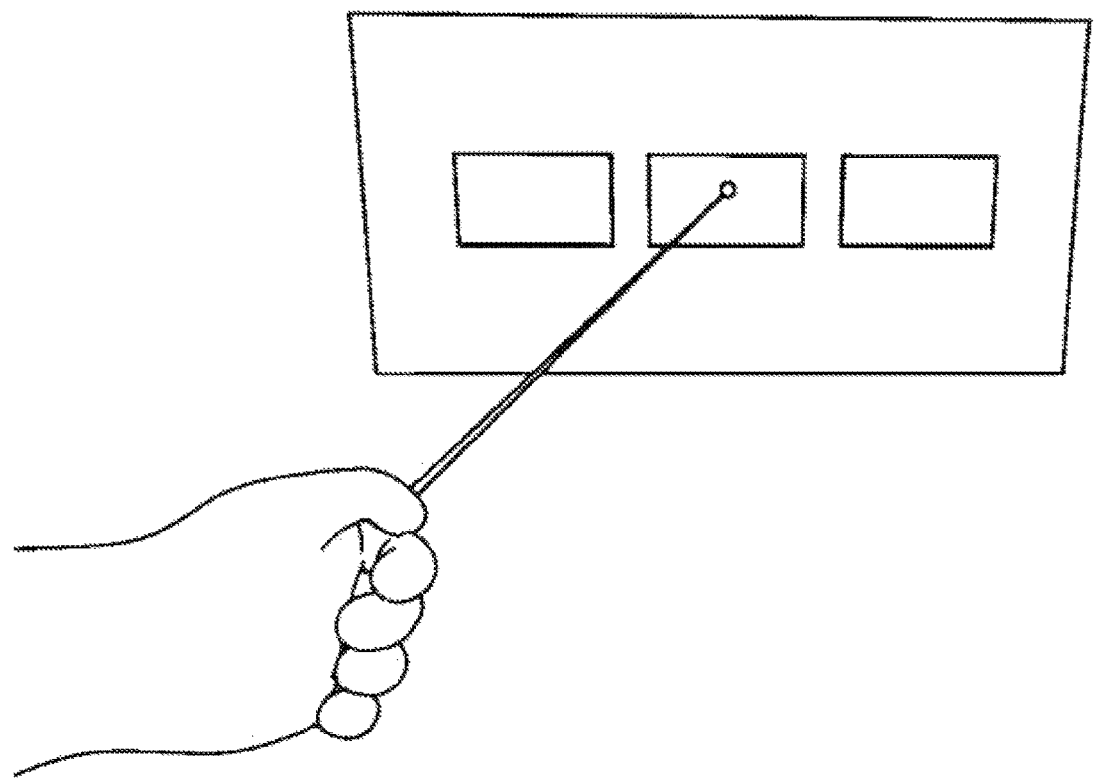
FIG. 4 is a schematic diagram of a virtual ray in the gesture operation method according to an embodiment of the present disclosure.

In the embodiment shown in FIG. 1, FIG. 3 and FIG. 4, the thumb ball is bound to the thumb position of the virtual hand, and the forefinger cuboid is bound to the forefinger position, so as to obtain the distance between the thumb ball and the forefinger cuboid; and when the user has certain needs, the second trigger condition is triggered in a pinching way with the thumb and the forefinger. That is, the user makes a pinching action with the thumb and the forefinger to allow the thumb to approach the forefinger so as to form the distance between the thumb ball and the forefinger cuboid; if the distance between the thumb ball and the forefinger cuboid is smaller than the predetermined pinching threshold, the second trigger condition is established; and moreover, after the second trigger condition is established, the corresponding interactive operation corresponding to the second trigger condition is directly initiated automatically. In the present embodiment, the interactive operation corresponding to the second trigger condition may be any operation with "clicking", "pressing" and other properties, which is not limited herein.

In the embodiment shown in FIG. 1, FIG. 3 and FIG. 4, a virtual ray is determined by specific positions of the joint and the hand of the user; and the virtual ray may be colored or colorless in actual applications. For convenience of illustration, the virtual ray in FIG. 4 is a visible colored line starting from the hand to the displayer; however, in the present embodiment, the virtual ray is intersected with the displayer of the VR system, and the virtual cursor in the displayer is located at the intersection. When the user moves the hand, the virtual ray may also move with the hand, so that the user moves the virtual cursor in the displayer in a way of moving the hand, that is, a position to be clicked in the displayer is selected by moving the hand. If the virtual cursor is moved to the position to be clicked, and the second trigger condition is triggered in a pinching way with the thumb and the forefinger to establish the second trigger condition, the virtual cursor clicks any page key that can be clicked in the displayer, for example, clicking an APP icon in the page, clicking confirmation, and clicking cancel; and the operation after clicking the virtual cursor is not described in detail herein. In the present embodiment, if the second trigger condition is established, and after the content in the page of the displayer is clicked, the clicking action takes effect immediately after the user releases the thumb. Therefore, the second trigger condition can also correspond to the interactive operation of dragging or sliding the content in the interface of the displayer, that is, the user performs the pinching action, and the virtual cursor clicks the content in the displayer; at the time, the user may move the whole hand, so that the virtual cursor moves the clicked content to move with the movement of the hand; and after the clicked content moves to a target position, the user releases the thumb to end the pinching action, so that the dragging or sliding operation takes effect.

It should be noted that the interactive operations corresponding to the first trigger condition and the second trigger condition respectively can be preset in advance; and an interactive operation target may be any target key or interface that can be operated by a bare hand in the VR system, and more operation details are not repeated herein.

As mentioned above, according to the gesture operation method provided by the present disclosure, the depth information of the user hand is obtained, the space coordinates of the virtual hand corresponding to the hand in the virtual space are determined based on the depth information; then the trackballs are bound to the virtual hand based on the space coordinates, which including binding the palm ball to the palm position of the virtual hand, and binding the at least one fingertip ball to the at least one fingertip position of the virtual hand, the volume of the palm ball being greater than the at least one fingertip ball; and the corresponding operation is performed in the virtual space based on a straight-line distance between the at least one fingertip ball and the palm ball. According to the gesture operation method, because of the introduction of the small ball moving with the hand, a purpose of bare hand operation is achieved; the stability is higher, and the accuracy requirement is lower, thereby reducing the manpower and financial resources; and moreover, since the accuracy requirement is relatively low, the clicking operation is facilitated, thereby greatly improving the interaction experience of the user.

As shown in FIG. 5, the present disclosure provides a gesture operation apparatus 100 to implement the aforementioned gesture operation method, which includes:

an information obtaining module 101 configured to obtain depth information of a user hand;

a coordinate corresponding module 102 configured to determine space coordinates of a virtual hand corresponding to the hand in a virtual space based on the depth information of the hand;

a tracking and binding module 103 configured to bind trackballs to the virtual hand based on the space coordinates, which binding a palm ball to a palm position of the virtual hand, and binding at least one fingertip ball to at least one fingertip position of the virtual hand, a volume of the palm ball being greater than the at least one fingertip ball; and an interaction performing module 104 configured to perform a corresponding operation in the virtual space based on a straight-line distance between the at least one fingertip ball and the palm ball.

In the embodiment shown in FIG. 5, the coordinate corresponding module 102 includes:

a true position calculation unit 102-1 configured to obtain a relative distance between the hand and a sensor; and obtain a true wrist position of the hand based on a position of the sensor and the relative distance;

a virtual coordinate corresponding unit 102-2 configured to map the true wrist position into the virtual space with reference to virtual coordinates of the sensor to form wrist space coordinates; and perform calculation and filling based on the wrist space coordinates and hand joint information to form the virtual hand, and obtain the space coordinates of the virtual hand.

Furthermore, the gesture operation apparatus 100 provided by the present disclosure further includes a pinching operation unit 105 (not shown in the drawing).

The pinching operation unit 105 is configured to obtain a distance between the thumb ball and the forefinger cuboid, where the distance between the thumb ball and the forefinger cuboid represents a distance between the thumb ball and the forefinger cuboid formed when the thumb approaches the forefinger to make a pinching action; and trigger an operation cursor at a corresponding position of the virtual hand based on the distance between the thumb ball and the forefinger cuboid to perform the corresponding operation in the virtual space.

Different corresponding functions are set respectively based on the straight-line distance between the at least one fingertip ball and the palm ball and the distance between the thumb ball and the forefinger cuboid, so that the user may realize two types of interaction modes through a single hand; and the specific interactive operation is not limited herein, and may be determined according to the user requirement, thereby improving the interestingness and stability of the bare hand operation of the user.

It may be seen from the above embodiments that according to the gesture operation apparatus provided by the present disclosure, the depth information of the user hand is obtained, the space coordinates of the virtual hand corresponding to the hand in the virtual space are determined based on the depth information; then the trackballs are bound to the virtual hand based on the space coordinates, which including binding the palm ball to the palm position of the virtual hand, and binding the at least one fingertip ball to the at least one fingertip position of the virtual hand, the volume of the palm ball being greater than the at least one fingertip ball; and the corresponding operation is performed in the virtual space based on the straight-line distance between the at least one fingertip ball and the palm ball. According to the gesture operation method, because of the introduction of the small ball moving with the hand, a purpose of bare hand operation is achieved; the stability is higher, and the accuracy requirement is lower, thereby reducing the manpower and financial resources; and moreover, since the accuracy requirement is relatively low, a clicking operation is facilitated, thereby greatly improving the interaction experience of the user.

It should be understood that the apparatus embodiment may correspond to the method embodiment, and similar description may refer to the method embodiment. To avoid repetition, details are not described here.

FIG. 6 is a schematic block diagram of an electronic device according to an embodiment of the present disclosure. As shown in FIG. 6, the electronic device 200 may include: a memory 210 and a processor 220. The memory 210 has a computer program stored thereon. The memory 210 transmits program codes to the processor 220. In other words, the processor 220 may invoke and execute the computer program from the memory 210 to implement the gesture operation method in the embodiment of the present disclosure.

For example, the processor 220 may be configured to perform the embodiment of the gesture operation method in accordance with instructions in the computer program.

In some embodiments of the present disclosure, the processor 220 may include, but is not limited to:

a general-purpose processor, a digital signal processor (DSP), an application specific integrated circuit (ASIC), a field programmable gate array (FPGA) or other programmable logic devices, discrete gate or transistor logic devices, discrete hardware components, etc.

In some embodiments of the present disclosure, the memory 210 includes but is not limited to:

a volatile memory and/or a nonvolatile memory. The nonvolatile memory may be a read-only memory (ROM), a programmable read-only memory (PROM), an erasable programmable read-only memory (EPROM), an electrically EPROM (EEPROM) or a flash memory. The volatile memory may be a random access memory (RAM), which is used as an external cache. By way of illustration but not limitation, the RAM in a lot of forms is available, such as static RAM (SRAM), dynamic RAM (DRAM), synchronous DRAM (SDRAM), double data rate SDRAM (DDR SDRAM), enhanced SDRAM (ESDRAM), synch DRAM (SLDRAM) and direct Rambus RAM (DR RAM).

In some embodiments of the present disclosure, the computer program may be segmented into one or more modules; and the one or more modules are stored in the memory 210 and executed by the processor 220 so as to complete the gesture operation method provided by the present disclosure. The one or more modules may be a series of computer program instruction segments capable of completing specific functions; and the instruction segments are used for describing an execution process of the computer program in the electronic device.

As shown in FIG. 6, the electronic device may further include: a transceiver 230. The transceiver 230 may be connected to the processor 220 or the memory 210.

The processor 220 may control the transceiver 230 to be communicated with other devices; and specifically, the transceiver may transmit information or data to other devices, or receive information or data transmitted by other devices. The transceiver 230 may include a transmitter and a receiver. The transceiver 230 may further include one or more antenna.

It should be understood that various components in the electronic device are connected through a bus system. Besides a data bus, the bus system includes a power supply bus, a control bus and a state signal bus.

The present disclosure provides a computer readable storage medium having a computer program stored thereon. The computer program, when executed by a computer, causes the computer to perform the method in the method embodiment.

An embodiment of the present disclosure provides a computer program product containing program instructions. The program instructions, when executed on an electronic device, cause the electronic device to perform the method in the method embodiment.

When software is used for implementation, the implementation may be performed completely or partially in a form of the computer program product. The computer program product includes one or more computer instructions. When the computer program instructions are loaded and executed on a computer, all or some of processes or functions according to the embodiment of the present disclosure are generated. The computer may be a general-purpose computer, a dedicated computer, a computer network or other programmable apparatuses. The computer instructions may be stored in a computer readable storage medium, or may be transmitted from one computer readable storage medium to another computer readable storage medium, for example, the computer instructions may be transmitted from a web site, a computer, a server or a data center to another web site, computer, server or data center through a cable (such as a coaxial cable, an optical fiber, a digital subscriber line (DSL)), or in a wireless way (such as infrared, wireless, microwaves, etc.). The computer readable storage medium may be any available medium that the computer can access or a data storage device containing one or more available media such as the server, data center, etc. The available medium may be a magnetic medium (such as floppy disk, hard disk, magnetic tape), an optical medium (such as digital video disc (DVD)), or a semiconductor medium (such as solid state disk (SSD)), etc.

Those ordinary skilled in the art may realize that modules and algorithm steps of various examples described in the embodiments disclosed herein can be implemented by electronic hardware or a combination of computer software and the electronic hardware. Whether these functions are executed with hardware or software depend on the specific application and designed constraint conditions of the technical solution. Professional technicians can use different methods to implement the described functions for each specific application, but such implementation should not be considered beyond the scope of the present disclosure.

In the embodiments provided in the present disclosure, it should be understood that the disclosed apparatuses and methods may be implemented in other ways. For example, the apparatus embodiments described above are merely illustrative. For example, the division of the modules is only a logical function division, and there may be other divisions in actual implementation, for example, multiple modules or components may be combined or integrated into another system, or some features may be ignored or not implemented. In addition, the displayed or discussed mutual coupling or direct coupling or communication connection may be indirect coupling or communication connection through interfaces, apparatuses or modules, and may be in electrical, mechanical or other forms.

The modules serving as separate components may be or may not be physically separated, and the components displayed as modules may or may not be physical modules, that is, the modules may be located in one place or may be distributed on a plurality of network units. Some or all of the modules may be selected according to actual needs to achieve the purposes of the solutions of the embodiments. Furthermore, all functional modules in various embodiments of the present disclosure may be integrated into one processing module, may also be physically separated, or two or more of the functional modules may be integrated into one module.

The gesture operation method, apparatus, device and medium provided by the present disclosure are described by way of example with reference to the accompanying drawings. However, it should be understood by those skilled in the art that various improvements may be made to the gesture operation method, device, apparatus and medium provided by the present disclosure without departing from the content of the present disclosure. Therefore, the protection scope of the present disclosure should be defined by the content of the appended claims.

What is claimed is:

1. A gesture operation method, comprising:
   obtaining depth information of a user hand;
   determining space coordinates of a virtual hand corresponding to the hand in a virtual space based on the depth information of the hand;
   binding trackballs to the virtual hand based on the space coordinates, which comprises binding a palm ball to a palm position of the virtual hand, and binding at least one fingertip ball to at least one fingertip position of the virtual hand, a volume of the palm ball being greater than the at least one fingertip ball;
   performing a corresponding operation in the virtual space based on a straight-line distance between the at least one fingertip ball and the palm ball;
   wherein the at least one fingertip ball comprises a little-finger fingertip ball, a fourth-finger fingertip ball and a middle-finger fingertip ball; and
   wherein said performing the corresponding operation in the virtual space based on the straight-line distance between the fingertip ball and the palm ball comprises:
   obtaining the straight-line distance between the at least one fingertip ball and the palm ball, wherein the straight-line distance represents a straight-line distance between the at least one fingertip ball and the palm ball formed when the finger except the thumb approaches the palm to make a fist action; and performing the corresponding operation in the virtual space based on the straight-line distance between the at least one fingertip ball and the palm ball.

2. The gesture operation method according to claim 1, wherein said determining the space coordinates of the virtual hand corresponding to the hand in the virtual space based on the depth information of the hand comprises:
   obtaining a relative distance between the hand and a sensor;
   obtaining a true wrist position of the hand based on a position of the sensor and the relative distance;
   mapping the true wrist position into the virtual space with reference to virtual coordinates of the sensor, to form wrist space coordinates; and
   performing calculation and filling based on the wrist space coordinates and hand joint information to form the virtual hand, and obtaining the space coordinates of the virtual hand.

3. The gesture operation method according to claim 1, wherein said binding the palm ball to the palm position of the virtual hand, and said binding the at least one fingertip ball to the at least one fingertip position of the virtual hand comprise:
   obtaining a virtual palm position and at least one virtual fingertip position of the virtual hand; and
   arranging the palm ball at the virtual palm position, and arranging the at least one fingertip ball at the at least one virtual fingertip position,
   wherein the palm ball always moves as the virtual palm position moves; and
   the at least one fingertip ball always moves as the at least one virtual fingertip position moves.

4. The gesture operation method according to claim 1, further comprising: binding a thumb ball to a thumb position of the virtual hand, and binding a forefinger cuboid to a forefinger position of the virtual hand, wherein
   said binding the thumb ball to the thumb position of the virtual hand, and said binding the forefinger cuboid to the forefinger position of the virtual hand comprise:
   obtaining a virtual thumb position and a virtual forefinger position; and
   arranging the thumb ball at the virtual thumb position, and arranging the forefinger cuboid at the virtual forefinger position,
   wherein the thumb ball always moves as the virtual thumb position moves; and
   the forefinger cuboid always moves as the virtual forefinger position moves.

5. The gesture operation method according to claim 4, further comprising:
   obtaining a distance between the thumb ball and the forefinger cuboid, wherein the distance between the thumb ball and the forefinger cuboid represents a distance between the thumb ball and the forefinger cuboid formed when the thumb approaches the forefinger to make a pinching action; and
   triggering an operation cursor at a corresponding position of the virtual hand based on the distance between the thumb ball and the forefinger cuboid, to perform the corresponding operation in the virtual space.

6. An electronic device, comprising:
   a memory having a computer program stored thereon; and
   a processor configured to invoke and execute the computer program stored in the memory to:
   obtain depth information of a user hand;
   determine space coordinates of a virtual hand corresponding to the hand in a virtual space based on the depth information of the hand;
   bind trackballs to the virtual hand based on the space coordinates, which comprises binding a palm ball to a palm position of the virtual hand, and binding at least one fingertip ball to at least one fingertip position of the virtual hand, a volume of the palm ball being greater than the at least one fingertip ball;
   perform a corresponding operation in the virtual space based on a straight-line distance between the at least one fingertip ball and the palm ball;
   wherein the at least one fingertip ball comprises a little-finger fingertip ball, a fourth-finger fingertip ball and a middle-finger fingertip ball; and
   wherein said performing the corresponding operation in the virtual space based on the straight-line distance between the fingertip ball and the palm ball comprises:
   obtaining the straight-line distance between the at least one fingertip ball and the palm ball, wherein the straight-line distance represents a straight-line distance between the at least one fingertip ball and the palm ball formed when the finger except the thumb approaches the palm to make a fist action; and performing the corresponding operation in the virtual space based on the straight-line distance between the at least one fingertip ball and the palm ball.

7. The electronic device according to claim 6, wherein said determining the space coordinates of the virtual hand corresponding to the hand in the virtual space based on the depth information of the hand comprises:
   obtaining a relative distance between the hand and a sensor;
   obtaining a true wrist position of the hand based on a position of the sensor and the relative distance;
   mapping the true wrist position into the virtual space with reference to virtual coordinates of the sensor, to form wrist space coordinates; and
   performing calculation and filling based on the wrist space coordinates and hand joint information to form the virtual hand, and obtaining the space coordinates of the virtual hand.

8. The electronic device according to claim 6, wherein said binding the palm ball to the palm position of the virtual hand, and said binding the at least one fingertip ball to the at least one fingertip position of the virtual hand comprise:
   obtaining a virtual palm position and at least one virtual fingertip position of the virtual hand; and
   arranging the palm ball at the virtual palm position, and arranging the at least one fingertip ball at the at least one virtual fingertip position,
   wherein the palm ball always moves as the virtual palm position moves; and
   the at least one fingertip ball always moves as the at least one virtual fingertip position moves.

9. The electronic device according to claim 6, wherein the processor is further configured to invoke and execute the computer program stored in the memory to: bind a thumb ball to a thumb position of the virtual hand, and bind a forefinger cuboid to a forefinger position of the virtual hand, wherein
   said binding the thumb ball to the thumb position of the virtual hand, and said binding the forefinger cuboid to the forefinger position of the virtual hand comprise:
   obtaining a virtual thumb position and a virtual forefinger position; and
   arranging the thumb ball at the virtual thumb position, and arranging the forefinger cuboid at the virtual forefinger position,
   wherein the thumb ball always moves as the virtual thumb position moves; and
   the forefinger cuboid always moves as the virtual forefinger position moves.

10. The electronic device according to claim 9, wherein the processor is further configured to invoke and execute the computer program stored in the memory to:
    obtain a distance between the thumb ball and the forefinger cuboid, wherein the distance between the thumb ball and the forefinger cuboid represents a distance between the thumb ball and the forefinger cuboid formed when the thumb approaches the forefinger to make a pinching action; and
    trigger an operation cursor at a corresponding position of the virtual hand based on the distance between the thumb ball and the forefinger cuboid, to perform the corresponding operation in the virtual space.

11. A non-transitory computer readable storage medium, having a computer program stored thereon, wherein the computer program causes a computer to:
    obtain depth information of a user hand;
    determine space coordinates of a virtual hand corresponding to the hand in a virtual space based on the depth information of the hand;
    bind trackballs to the virtual hand based on the space coordinates, which comprises binding a palm ball to a palm position of the virtual hand, and binding at least one fingertip ball to at least one fingertip position of the virtual hand, a volume of the palm ball being greater than the at least one fingertip ball;
    perform a corresponding operation in the virtual space based on a straight-line distance between the at least one fingertip ball and the palm ball;
    wherein the at least one fingertip ball comprises a little-finger fingertip ball, a fourth-finger fingertip ball and a middle-finger fingertip ball; and
    wherein said performing the corresponding operation in the virtual space based on the straight-line distance between the fingertip ball and the palm ball comprises:
    obtaining the straight-line distance between the at least one fingertip ball and the palm ball, wherein the straight-line distance represents a straight-line distance between the at least one fingertip ball and the palm ball formed when the finger except the thumb approaches the palm to make a fist action; and performing the corresponding operation in the virtual space based on the straight-line distance between the at least one fingertip ball and the palm ball.

12. The non-transitory computer readable storage medium according to claim 11, wherein said determining the space coordinates of the virtual hand corresponding to the hand in the virtual space based on the depth information of the hand comprises:
    obtaining a relative distance between the hand and a sensor;
    obtaining a true wrist position of the hand based on a position of the sensor and the relative distance;
    mapping the true wrist position into the virtual space with reference to virtual coordinates of the sensor, to form wrist space coordinates; and
    performing calculation and filling based on the wrist space coordinates and hand joint information to form the virtual hand, and obtaining the space coordinates of the virtual hand.

13. The non-transitory computer readable storage medium according to claim 11, wherein said binding the palm ball to the palm position of the virtual hand, and said binding the at least one fingertip ball to the at least one fingertip position of the virtual hand comprise:
    obtaining a virtual palm position and at least one virtual fingertip position of the virtual hand; and
    arranging the palm ball at the virtual palm position, and arranging the at least one fingertip ball at the at least one virtual fingertip position,
    wherein the palm ball always moves as the virtual palm position moves; and
    the at least one fingertip ball always moves as the at least one virtual fingertip position moves.

14. The non-transitory computer readable storage medium according to claim 11, wherein the computer program causes the computer further to: bind a thumb ball to a thumb position of the virtual hand, and bind a forefinger cuboid to a forefinger position of the virtual hand, wherein
    said binding the thumb ball to the thumb position of the virtual hand, and said binding the forefinger cuboid to the forefinger position of the virtual hand comprise:

obtaining a virtual thumb position and a virtual forefinger position; and arranging the thumb ball at the virtual thumb position, and arranging the forefinger cuboid at the virtual forefinger position, wherein the thumb ball always moves as the virtual thumb position moves; and the forefinger cuboid always moves as the virtual forefinger position moves.

\* \* \* \* \*